(12) United States Patent
Matar et al.

(10) Patent No.: US 12,396,035 B2
(45) Date of Patent: *Aug. 19, 2025

(54) RATE AND ANTENNA SELECTION USING SINGLE TXOP

(71) Applicant: TEXAS INSTRUMENTS INCORPORATED, Dallas, TX (US)

(72) Inventors: Yuval Matar, Hod Hasharon (IL); Yaron Alpert, Hod Hasharon (IL)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/662,261

(22) Filed: May 13, 2024

(65) Prior Publication Data

US 2024/0298351 A1 Sep. 5, 2024

Related U.S. Application Data

(63) Continuation of application No. 17/850,715, filed on Jun. 27, 2022, now Pat. No. 12,022,515.

(51) Int. Cl.
*H04W 74/0816* (2024.01)
*H04L 1/00* (2006.01)
*H04L 5/00* (2006.01)
*H04W 72/044* (2023.01)
*H04W 74/08* (2009.01)

(52) U.S. Cl.
CPC ....... *H04W 74/0816* (2013.01); *H04L 1/0003* (2013.01); *H04L 5/0053* (2013.01); *H04W 72/0473* (2013.01); *H04W 74/0866* (2013.01)

(58) Field of Classification Search
CPC ......... H04W 74/0816; H04W 72/0473; H04W 74/0866; H04L 1/0003; H04L 5/0053
See application file for complete search history.

(56) References Cited

U.S. PATENT DOCUMENTS

| | | | |
|---|---|---|---|
| 8,340,115 B2 | 12/2012 | Waxman | |
| 9,379,789 B2 | 6/2016 | Lin | |
| 2018/0091201 A1* | 3/2018 | Yang | H04B 7/0602 |
| 2019/0207713 A1* | 7/2019 | Lomayev | H04L 1/0643 |
| 2019/0342916 A1* | 11/2019 | Liu | H04W 80/02 |
| 2020/0319324 A1* | 10/2020 | Au | H04W 48/16 |
| 2021/0105091 A1* | 4/2021 | Lomayev | H04L 5/0048 |
| 2021/0168828 A1* | 6/2021 | Desai | H04W 4/80 |
| 2021/0311162 A1* | 10/2021 | Mai | G01S 7/415 |
| 2022/0201600 A1* | 6/2022 | Reshef | H04W 72/02 |

* cited by examiner

*Primary Examiner* — Ajay Cattungal
(74) *Attorney, Agent, or Firm* — Michelle F. Murray; Frank D. Cimino

(57) ABSTRACT

In an example, a method includes obtaining, in a probing Wi-Fi device a transmit opportunity (TXOP) on a Wi-Fi channel. The method also includes transmitting a probe packet from the probing Wi-Fi device to a receiving Wi-Fi device during the TXOP with a first antenna. The method includes receiving first feedback responsive to transmitting the probe packet with the first antenna. The method also includes transmitting the probe packet from the probing Wi-Fi device to the receiving Wi-Fi device during the TXOP with a second antenna. The method includes receiving second feedback responsive to transmitting the probe packet with the second antenna. The method also includes setting, by the probing Wi-Fi device, a transmission parameters set and a selected antenna based at least in part on the first feedback or the second feedback.

21 Claims, 7 Drawing Sheets

RATE AND ANTENNA SELECTION USING SINGLE TXOP

CROSS-REFERENCE TO RELATED APPLICATIONS

This application is a continuation of U.S. patent application Ser. No. 17/850,715 filed Jun. 27, 2022, which application is hereby incorporated herein by reference.

BACKGROUND

Wi-Fi is a term used to represent communications using various ones of the Institute of Electrical and Electronics Engineers (IEEE) 802.11 family of wireless network protocols. Wi-Fi stations communicate by sending each other blocks of data (packets) over radio links. Link adaption refers to the matching of the modulation, coding, and other signal and protocol parameters to the conditions on the radio link. Link adaptation algorithms react to channel conditions by changing the operating point of the radio link with the goal of achieving performance criteria that may include a highest possible throughput and the lowest power consumption.

SUMMARY

In accordance with at least one example of the description, a method includes obtaining, in a probing Wi-Fi device a transmit opportunity (TXOP) on a Wi-Fi channel. The method also includes transmitting a probe packet from the probing Wi-Fi device to a receiving Wi-Fi device during the TXOP with a first antenna. The method includes receiving first feedback responsive to transmitting the probe packet with the first antenna. The method also includes transmitting the probe packet from the probing Wi-Fi device to the receiving Wi-Fi device during the TXOP with a second antenna. The method includes receiving second feedback responsive to transmitting the probe packet with the second antenna. The method also includes setting, by the probing Wi-Fi device, a transmission parameters set and a selected antenna based at least in part on the first feedback or the second feedback.

In accordance with at least one example of the description, a method includes obtaining, in a probing Wi-Fi device a TXOP on a Wi-Fi channel. The method also includes transmitting a first probe packet from the probing Wi-Fi device to a receiving Wi-Fi device during the TXOP with a first antenna, where the first probe packet is transmitted with a first transmission parameters set. The method includes receiving first feedback responsive to transmitting the first probe packet with the first antenna. The method also includes transmitting a second probe packet from the probing Wi-Fi device to the receiving Wi-Fi device during the TXOP with the first antenna, where the second probe packet is transmitted with a second transmission parameters set. The method includes receiving second feedback responsive to transmitting the second probe packet with the first antenna. The method also includes transmitting the second probe packet from the probing Wi-Fi device to the receiving Wi-Fi device during the TXOP with a second antenna, where the second probe packet is transmitted with the second transmission parameters set. The method includes receiving third feedback responsive to transmitting the second probe packet with the second antenna. The method also includes setting, by the probing Wi-Fi device, one or more transmission parameters within a transmission parameters set based at least in part on the first feedback, the second feedback, or the third feedback.

In accordance with at least one example of the description, a system includes a memory storing instructions in a probing Wi-Fi device. The system includes a processor coupled to a Wi-Fi transmitter and a Wi-Fi receiver in the probing Wi-Fi device, the Wi-Fi transmitter and the Wi-Fi receiver configured to communicate via a Wi-Fi channel. The processor is configured to execute the instructions stored in the memory. The instructions are executed to obtain a TXOP on a Wi-Fi channel. The instructions are also executed to transmit, by the Wi-Fi transmitter, a probe packet to a receiving Wi-Fi device during the TXOP with a first antenna, where the probe packet is transmitted with a transmission parameter within a transmission parameters set. The instructions are executed to receive first feedback at the Wi-Fi receiver responsive to transmitting the probe packet with the first antenna. The instructions are executed to transmit, by the Wi-Fi transmitter, the probe packet to the receiving Wi-Fi device during the TXOP with a second antenna, where the probe packet is transmitted with the transmission parameter within the transmission parameters set. The instructions are also executed to receive second feedback at the Wi-Fi receiver responsive to transmitting the probe packet with the second antenna. The instructions are executed to set, by the probing Wi-Fi device, the transmission parameter within the transmission parameters set and a selected antenna based at least in part on the first feedback or the second feedback.

BRIEF DESCRIPTION OF THE DRAWINGS

The same reference numbers or other reference designators are used in the drawings to designate the same or similar (functionally and/or structurally) features.

DETAILED DESCRIPTION

Figure 1:
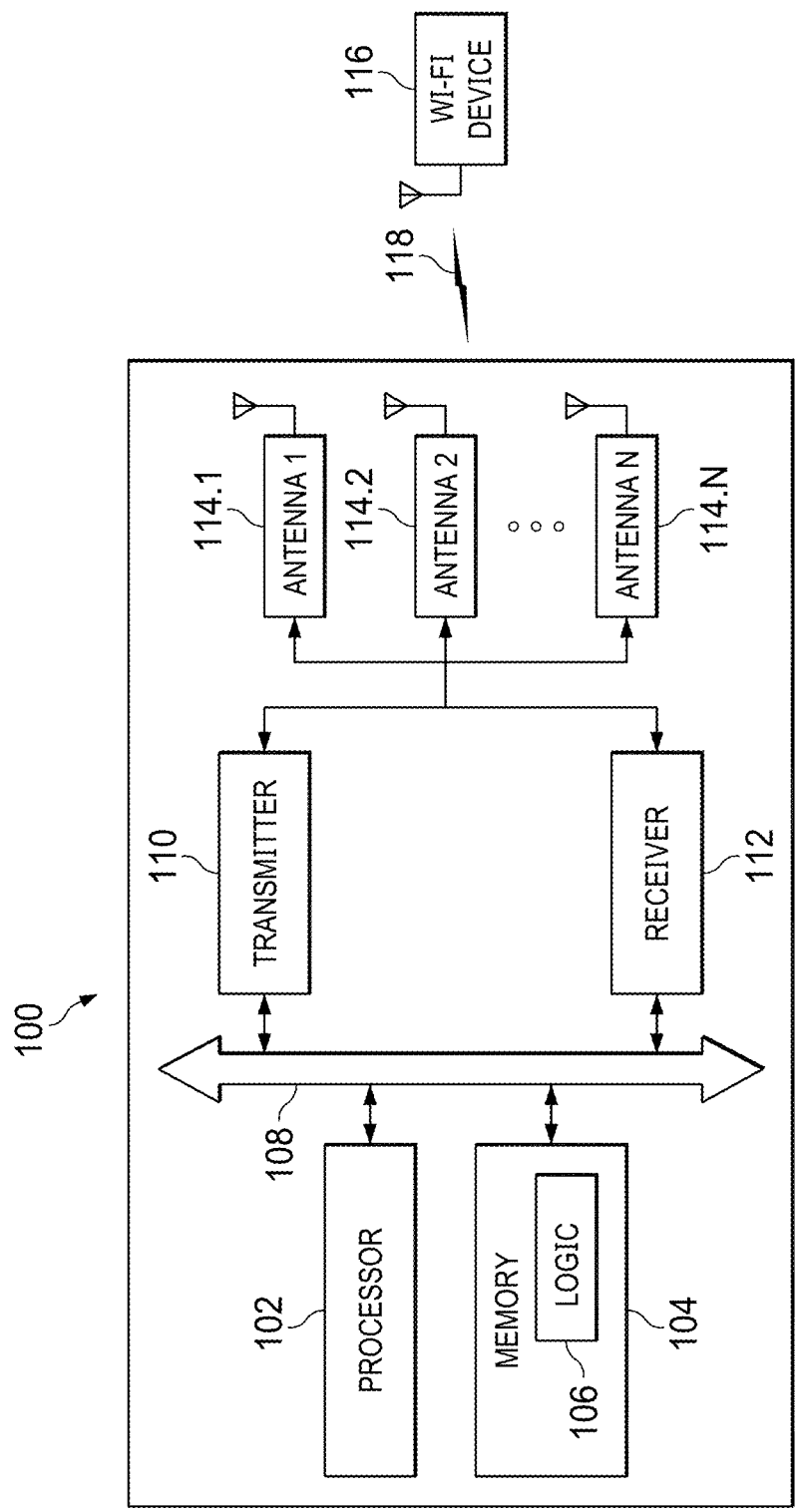
FIG. 1 is a block diagram of a Wi-Fi device in accordance with various examples.

Link adaptation in 802.11 protocol technologies includes the use of algorithm that change the device operating point of the link responsive to channel conditions. Some common degrees of freedom exercised by link adaptation algorithms are the choices of the modulation and coding scheme and the transmission power. For a multiple input multiple output (MIMO) system, more degrees of freedom are present. For example, the number of spatial streams and the specific antenna elements that may be used for those streams are also choices that may be evaluated by the link adaptation algorithm.

A Transmit Opportunity (TXOP) is a Quality of Service (QoS) feature of the IEEE 802.11 protocol that provides a Wi-Fi device with contention-free channel access for a limited period of time. The Wi-Fi device has to win an air access (using 802.11 enhanced distributed channel access (EDCA) procedure) to a specific channel for the duration of the TXOP. After the TXOP is complete, the Wi-Fi device may have to re-win the air access and issue a next available TXOP before transmitting again. In some systems, a Wi-Fi device determines its transmission characteristics or operation profile by assessing channel conditions before transmitting a data packet over the channel. The Wi-Fi device can assess channel conditions such as throughput (e.g., bit rate), power consumption (e.g., transmitter power), modulation coding scheme (MCS), or other transmitter and channel characteristics. The Wi-Fi device may seek to achieve performance criteria based on these channel characteristic estimations that may include the highest bit rate and/or lowest transmitter power that can be used.

In some assessment processes, the Wi-Fi device sets its transmitter channel characteristics assessments based on trial settings for bit rate and/or transmitter power and sends a probe packet to a receiving Wi-Fi device during a first TXOP. If the sending device receives a reply packet (e.g., an Acknowledgement (ACK) or other feedback indication) from the receiving device, the sending device may interpret it as an indication that the trial settings were effective for reliable transmission of the probe packet. The Wi-Fi device may then send one or more such additional probe packets sent at different trial settings to assess channel conditions during a second or subsequent TXOP. After the Wi-Fi device has assessed channel conditions, it transmits its data packet using selected transmitter settings that are based on the assessed channel conditions. However, transmitting each probe packet at a different TXOP may take a significant amount of time, as the Wi-Fi device must re-win the air access for the next available TXOP in the system. Also, in a system with multiple antennas, using a separate TXOP for each antenna can cause the duration of the link assessment process to grow with the number of antennas. In systems with large numbers of antennas that send multiple probes for each antenna, the time to complete the link assessment process may increase significantly.

In examples herein, a single TXOP is used for the link assessment process. During the single TXOP, an efficient and optimal transmission parameters setting is determined along with antenna selection. The collection of transmission parameters may be referred to herein as a transmission parameters set. A single receive chain transmitter generates a sequence of probes within a single TXOP. The probes may be Physical Layer Convergence Protocol (PLCP) Protocol Data Units (PPDUs) in some examples. In some examples, the probe packets are packets that are null, but the probing Wi-Fi device selects these packets to cause the receiving Wi-Fi device to send a reply. Each PPDU corresponds to a different set of transmission parameters via a different antenna. The probes are sent to a receiving device, which may send feedback to the transmitter if the PPDU was received. The transmitter, based on the feedback or lack of feedback responsive to a PPDU, chooses the next set of transmission probing parameters and antenna. The next PPDU could have lower or higher power, a lower or higher complexity power, modulation, and coding scheme, a different antenna, etc. The transmitter may again receive feedback and then send another probing PPDU. The Wi-Fi device may be configured to repeat the process until a suitable or optimal antenna is selected with a suitable or optimal set of transmission parameters within a transmission parameters set corresponding to the communication medium. In some examples, a data exchange may occur between the Wi-Fi devices during the single TXOP after the probing Wi-Fi device selects the antenna and transmission parameters.

FIG. 1 is a block diagram of Wi-Fi device 100 in accordance with various examples herein. Wi-Fi device 100 includes a processor 102 and a memory 104. The memory 104 stores instructions or logic 106 that, when executed by the processor 102, cause the processor 102 to perform the various functionalities described herein. The memory 104 is one example of a non-transitory, computer-readable medium. The components in Wi-Fi device 100 may be coupled through a bus 108, or in any other suitable manner. In FIG. 1, an example in which the components are coupled through a bus 108 is shown.

Wi-Fi device 100 also includes a transmitter 110 and receiver 112. Wi-Fi device 100 may be a single receive chain device in one example. Wi-Fi device 100 may include any number of antennas, such as antenna 114.1, 114.2, and so on, to antenna 114.N (collectively, antennas 114). Wi-Fi device 100 may communicate with another Wi-Fi device 116 over a link 118. In some examples, Wi-Fi device 100 is referred to as a probing Wi-Fi device and Wi-Fi device 116 is referred to as a receiving Wi-Fi device.

The processor 102 is configured to read and execute computer-readable instructions. For example, the processor 102 is configured to invoke and execute instructions in a program stored in the memory 104, including logic 106. In some examples, logic 106 includes one or more link adaptation algorithms. Responsive to the processor 102 transmitting data, the processor 102 drives or controls the transmitter 110 to perform the transmitting. The processor 102 also drives or controls the receiver 112 to perform receiving, responsive to the processor 102 receiving data. Therefore, the processor 102 may be considered as a control center for performing the transmitting or receiving of data and the transmitter 110 and receiver 112 are executors for performing the transmitting and receiving operations.

This disclosure attributes functionality to the Wi-Fi device 100, the processor 102, and the logic 106. Wi-Fi device 100, processor 102, and logic 106 may include processing circuitry such as one or more processors (e.g., one or more processing cores). Wi-Fi device 100, the processor 102, and the logic 106 may include any combination of integrated circuitry, discrete logic circuitry, analog circuitry, such as one or more microprocessors, microcontrollers, digital signal processors, application specific integrated circuits, central processing units, field-programmable gate arrays, and/or any other processing resources. The techniques described in this disclosure may also be embodied or encoded in an article of manufacture including a non-transitory computer-readable storage medium, such as memory 104. Although processor 102 is described as a single processor, the processor 102 may include multiple components, such as any combination of the processing resources listed above, as well as other discrete or integrated logic circuitry, and/or analog circuitry.

In some examples, the memory 104 is coupled to the processor 102 through the bus 108. In other examples, the memory 104 is integrated with the processor 102. The memory 104 is configured to store various software programs and/or multiple groups of instructions, including the logic 106. The memory 104 may include one or more storage devices. For example, the memory 104 may include a high-speed random-access memory and/or may include a nonvolatile memory such as one or more disk storage devices, a flash memory, another nonvolatile solid-state storage device, or a pseudo-static random-access memory (PSRAM). The memory 104 may store an OS such as ANDROID, IOS, WINDOWS or LINUX. The memory 104 may further store a network communications program. The network communications program is useful for performing communications with one or more attached devices, one or more user devices, or one or more network devices. The memory 104 may further store a user interface program. The user interface program displays content of an application through a graphical interface and receives data or an operation performed by a user on the application via an input control such as a menu, a dialog box or a physical input device (not shown). The memory 104 is configured to store the instructions or logic 106 for implementing the various methods and processes provided in accordance with the various examples of this description.

The Wi-Fi device 100 may also include another communication component such as a Global Positioning System (GPS) module, cellular module, a BLUETOOTH or BLUETOOTH Low Energy (BLE) module, Zigbee module, Long Term Evolution (LTE), LTE-Machine Type Communication (LTE-M), Narrow Band LTE (NB-LTE), Sub-Gigahertz Communication (sub1G), or a Wireless Fidelity (WI-FI) module. The Wi-Fi device 100 may also support another wireless communication signal such as a satellite signal or a short-wave signal. The Wi-Fi device 100 may also be provided with a wired network interface or a local area network (LAN) interface to support wired communication.

In various examples, the Wi-Fi device 100 may further include an input/output interface (not shown) for enabling communications between Wi-Fi device 100 and one or more input/output devices (not shown). Examples of the input/output devices include an audio input/output device, a key input device, a display and the like. The input/output devices are configured to implement interaction between the Wi-Fi device 100 and a user or an external environment. The input/output device may further include a camera, a touchscreen, a sensor, and the like. The input/output device communicates with the processor 102 through a user interface.

The Wi-Fi device 100 shown in FIG. 1 is an example of a Wi-Fi system or device. During actual application, the Wi-Fi device 100 may include more or fewer components. The Wi-Fi device 100 may connect to other Wi-Fi devices, such as Wi-Fi device 116, during operation.

In an example operation, Wi-Fi device 100 performs a transmission rate and antenna selection process that includes the following phases at a single TXOP. First, Wi-Fi device 100 performs an initial transmission rate selection phase at an initial antenna. Second, Wi-Fi device 100 performs a probing phase at an alternate antenna, and then performs antenna selection. Third, Wi-Fi device 100 may perform an optional final rate selection phase. Fourth, Wi-Fi device 100 may perform a data exchange phase with another Wi-Fi device.

In examples herein, Wi-Fi device 100 may can alternate between antenna elements and the transmission parameters optimization during a single TXOP channel assessment probing phase. During a TXOP, the channel used is unavailable to other devices or users. Therefore, other users will not interfere with the link assessment procedure performed by Wi-Fi device 100, allowing Wi-Fi device 100 to complete the link assessment procedure in a timely fashion. This becomes more important as the number of antenna increases, which may require a longer link assessment procedure to find an optimal antenna. If the Wi-Fi device 100 were to use multiple TXOPs, the Wi-Fi device 100 would have to compete for each TXOP with other devices, and would have to wait until the channel is clear again if Wi-Fi device 100 lost the competition for a TXOP. By using a single TXOP, Wi-Fi device 100 can select a suitable or optimal antenna with a suitable or optimal set of transmission parameters within a transmission parameters set corresponding to the communication medium without waiting for additional TXOPs to become available.

In one example operation, Wi-Fi device 100 generates a sequence of multi-antenna probing PPDUs that will be transmitted during a single TXOP. This sequence may be referred to as a PPDU burst. The PPDUs may be a short, probing transmission that does not include any data payload, such as a QoS (quality of service) Null frame. Each PPDU in the burst may correspond to a different transmission antenna 114 in one example. Transmitter 110 begins transmitting the PPDU burst at an initial antenna, such as antenna 114.1.

The Wi-Fi device 100 then receives feedback regarding the transmitted PPDUs. The feedback can be an acknowledgement, or ACK, in one example. If Wi-Fi device 100 receives an ACK, then the transmission parameters used for that PPDU were good enough to successfully complete a transmission for that channel and that receiving device. If Wi-Fi device 100 does not receive an acknowledgement, a NACK results (not acknowledgement or negative acknowledgement). If a NACK occurs, this means the transmission parameters and/or the antenna did not complete the transmission. Another type of feedback received by Wi-Fi device 100 may be the packet error rate. Another type of feedback may be channel state information (CSI). The Wi-Fi device 100 may transmit a probe that results in Wi-Fi device 100 receiving some type of CSI back in return.

After the Wi-Fi device 100 receives feedback responsive to the PPDUs, Wi-Fi device 100 analyzes the feedback. Based on the feedback, Wi-Fi device 100 can assess and evaluate the channel condition. If the PPDU resulted in an ACK, the Wi-Fi device 100 may proceed to transmitting data using the same antenna and transmission parameters set as the successful PPDU. The Wi-Fi device 100 may send another PPDU using the same antenna with a different transmission parameters set. The Wi-Fi device 100 may send another PPDU using a different antenna with the same transmission parameters set as the first PPDU, or with a different transmission parameters set. The Wi-Fi device 100 may be configured to perform all of these actions during the same TXOP. The TXOP may last as long as requested, so Wi-Fi device 100 may request enough time to perform the potential PPDU bursts for the antennas 114.

In another example operation, Wi-Fi device 100 may prepare a PPDU burst that corresponds to a different set of transmission parameters, such as antenna, bit rate, transmitter power, modulation and coding scheme, etc. With this option, the Wi-Fi device 100 may select an optimal antenna along with transmission parameters that match the communication medium in which the system operates. Therefore, the Wi-Fi device 100 may be configured to perform antenna selection and transmission parameters set optimization at the same TXOP.

In another example operation, the Wi-Fi device 100 may combine probing with data exchange. A PPDU burst may include a data exchange after the probing sequence. The multi-antenna selection methodology described herein allows the setting of a subsequent transmission's configurations to an optimal or suitable state based on the results of the link assessment process. Therefore, the Wi-Fi device 100 may perform antenna selection, transmission parameters set optimization, and data exchange at the same TXOP.

Figure 2:
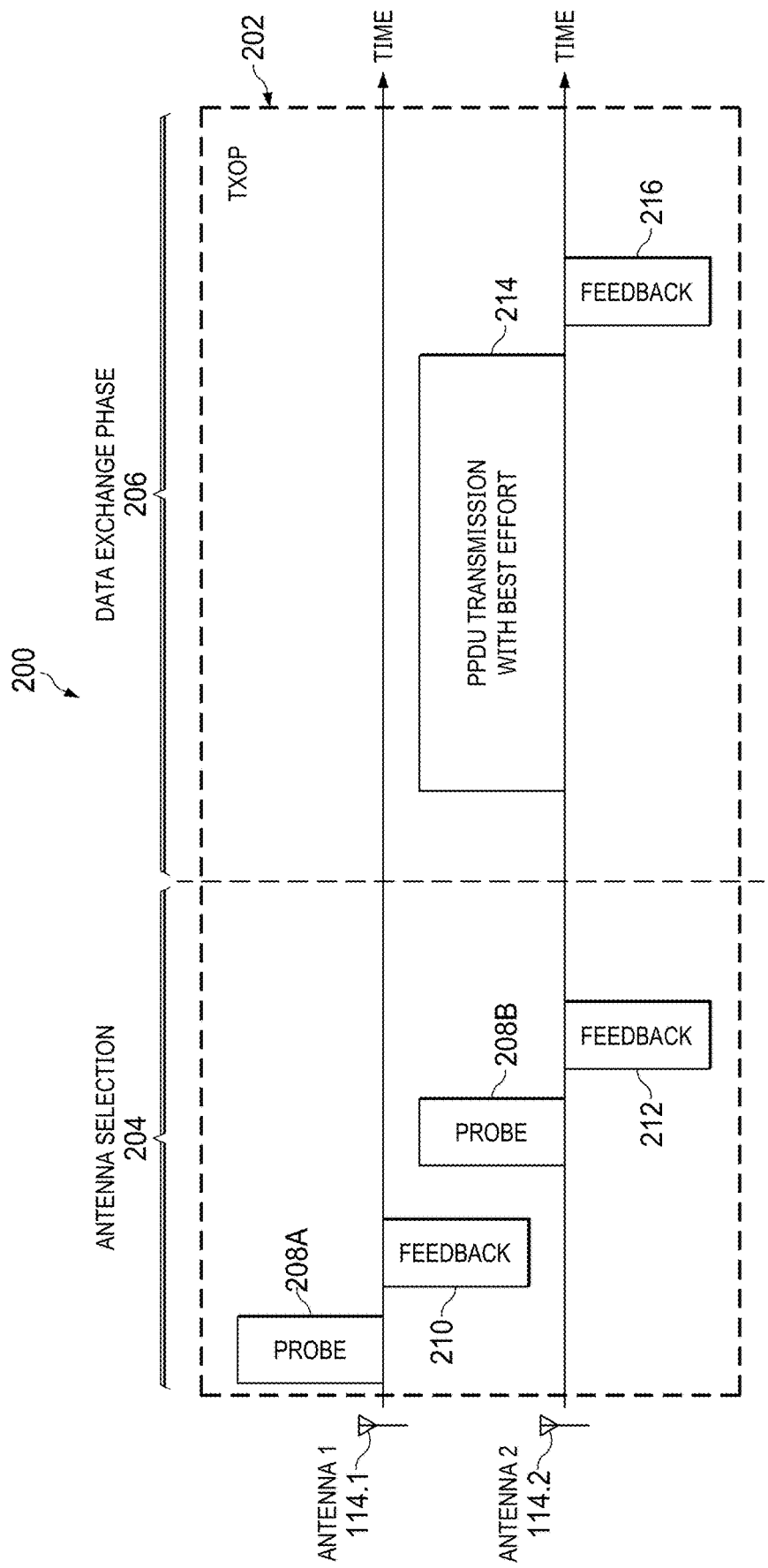
FIG. 2 is a timing diagram of antenna selection in accordance with various examples.

FIG. 2 is a timing diagram 200 of antenna selection using a PPDU burst in accordance with various examples herein. Timing diagram 200 shows a TXOP 202 where a Wi-Fi device performs antenna selection using a consecutive multi-antenna probing PPDU burst. In timing diagram 200, the Wi-Fi device selects the antenna to be used for a next transmission.

The example of timing diagram 200 includes two antennas, a first antenna 114.1 and a second antenna 114.2. The TXOP 202 in this examples includes an antenna selection phase 204 and a data exchange phase 206. At the start of the antenna selection phase 204, first antenna 114.1 transmits a first probe packet 208A to a receiving Wi-Fi device, such as Wi-Fi device 116. The Wi-Fi device 100 transmits first probe packet 208A with a set of transmission parameters. For example, first probe packet 208A may have a certain transmission power, a certain bit rate, a certain MCS, etc. The MCS may be binary phase shift keying (BPSK), quadrature phase shift keying (QPSK), quadrature amplitude modulation (QAM), or any other suitable modulation coding scheme. The first probe packet 208A may include other transmission parameters as well. The Wi-Fi device 100 may be configured to store the transmission parameters in a memory such as memory 104, so the Wi-Fi device 100 may track the performance of the probe packets with different transmission parameters in order to assess the channel conditions to find a suitable or optimal antenna and a suitable or optimal set of transmission parameters corresponding to the communication medium.

After the Wi-Fi device 100 transmits first probe packet 208A, first antenna 114.1 may receive feedback 210. Feedback 210 may be in the form of an ACK from the receiving Wi-Fi device. Feedback 210 may be a packet that includes CSI regarding the channel. Feedback 210 may include any other type of data that provides information regarding the channel. Also, in some examples, the Wi-Fi device 100 may not receive a response from the receiving Wi-Fi device. This non-acknowledgement, or NACK, is also a form of feedback that the Wi-Fi device 100 may receive. The Wi-Fi device 100 may store the feedback 210, for example in memory 104. The Wi-Fi device 100 may be configured to set a transmission parameter based at least in part on the feedback 210 and other feedback.

In the example of FIG. 2, after the Wi-Fi device 100 receives feedback 210, the Wi-Fi device 100 transmits a second probe packet 208B to a receiving Wi-Fi device using a second antenna 114.2. In this example, first probe packet 208A and second probe packet 208B have the same transmission parameters, with the exception of being transmitted by different antennas. For example, if first probe packet 208A has a first transmission power and a first bit rate, second probe packet 208B also has the first transmission power and the first bit rate.

After the Wi-Fi device 100 transmits second probe packet 208B, second antenna 114.2 may receive feedback 212. Feedback 212 may be any of the type of feedback described above with respect to feedback 210. In this example, Wi-Fi device 100 analyzes the feedback 210 and 212 and determines that second antenna 114.2, with the transmission parameters of second probe packet 208B, provides a suitable or optimal communication medium using those specific transmission parameters. For example, first antenna 114.1 may have received a NACK for feedback 210, while second antenna 114.2 received an ACK for feedback 212. Wi-Fi device may then transmit data during the data exchange phase 206 of TXOP 202 using second antenna 114.2 and the transmission parameters of probe packet 208B. This data transmission is shown as PPDU Transmission 214 in FIG. 2. After the Wi-Fi device 100 transmits PPDU Transmission 214 to a receiving Wi-Fi device, the second antenna 114.2 may receive feedback 216 from the receiving Wi-Fi device. The Wi-Fi device 100 may be configured to store and/or use this feedback 216 for later transmissions.

As shown in FIG. 2, a Wi-Fi device can use a single TXOP 202 for antenna selection with a multi-antenna probing PPDU burst. While two antennas are shown in FIG. 2, a Wi-Fi device may use any number of antennas in other examples. For example, the Wi-Fi device 100 may transmit a probe packet such as first probe packet 208A from more than two antennas, with the feedback from each probe packet used to select an optimal antenna and transmission parameters. After the Wi-Fi device 100 selects the antenna and transmission parameters, the Wi-Fi device 100 may transmit data to a receiving Wi-Fi device. The Wi-Fi device 100 may be configured to perform the entire process, including the data transmission, during a single TXOP 202. By using a single TXOP, the Wi-Fi device 100 does not have to compete with other devices for a TXOP for each antenna, which could take a large amount of time if the Wi-Fi device 100 had, for example, eight antennas.

Figure 3:
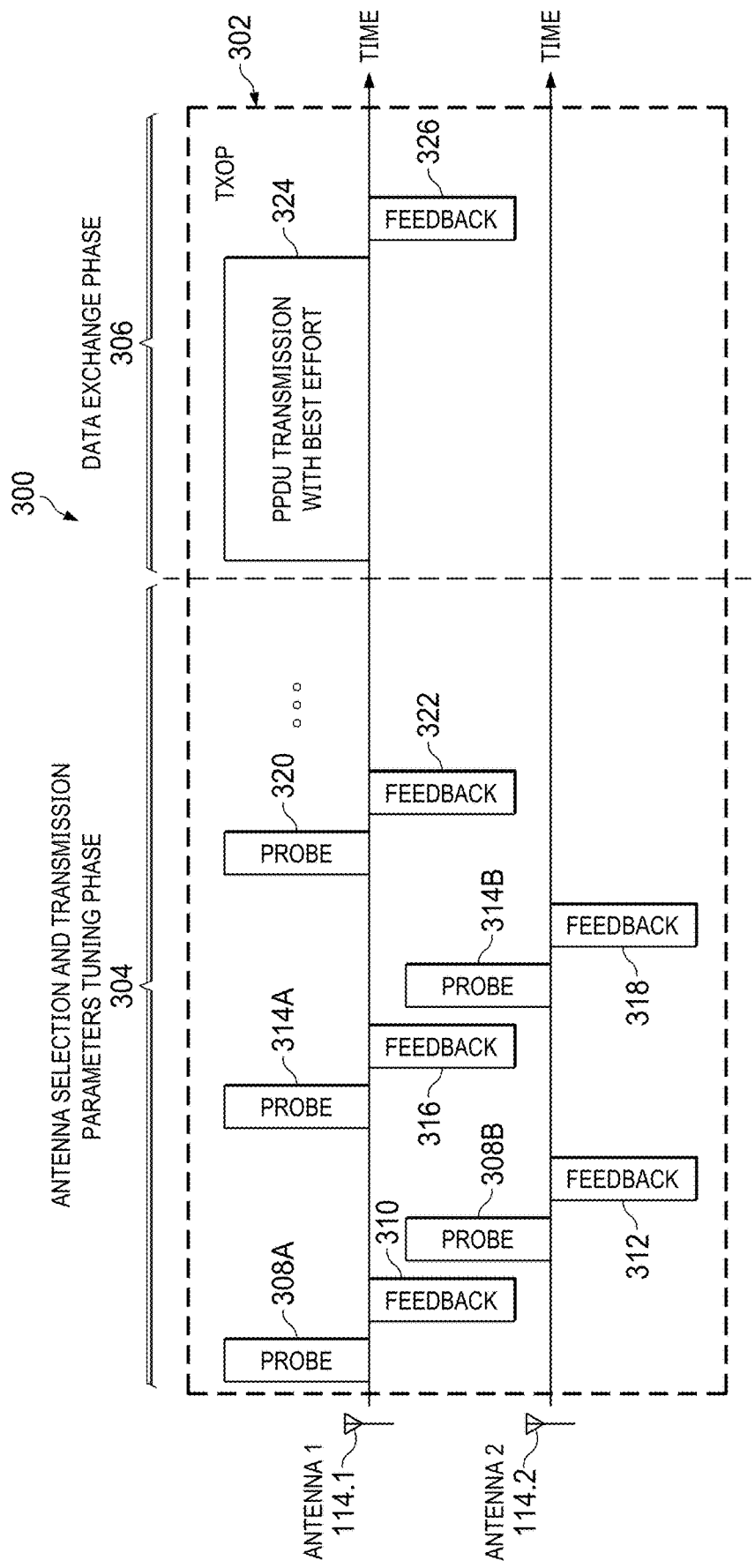
FIG. 3 is a timing diagram of antenna and rate selection in accordance with various examples.

FIG. 3 is a timing diagram 300 of antenna and rate selection using a PPDU burst in accordance with various examples herein. Timing diagram 300 shows a TXOP 302 where a Wi-Fi device performs antenna and rate selection and optimization using a consecutive multi-antenna probing PPDU burst. In timing diagram 300, the Wi-Fi device selects the antenna to be used for a next transmission and optimizes the transmission parameters according to the communication channel.

The example of timing diagram 300 includes two antennas, a first antenna 114.1 and a second antenna 114.2. The TXOP 302 in this examples includes an antenna selection and transmission parameters tuning phase 304 and a data exchange phase 306. At the start of tuning phase 304, first antenna 114.1 transmits a first probe packet 308A to a receiving Wi-Fi device, such as Wi-Fi device 116. The Wi-Fi device 100 transmits first probe packet 308A with a set of transmission parameters. For example, first probe packet 308A may have a certain transmission power, a certain bit rate, a certain MCS, a certain format, etc. The Wi-Fi device 100 may store transmission parameters in a memory such as memory 104, so the Wi-Fi device 100 may track the performance of the probe packets with different transmission parameters in order to assess the channel conditions to find a suitable or optimal antenna and a suitable or optimal set of transmission parameters corresponding to the communication medium.

After the Wi-Fi device 100 transmits first probe packet 308A, first antenna 114.1 may receive feedback 310. Feedback 310 may be in the form of an ACK from the receiving Wi-Fi device, a NACK, CSI, etc., as described above. The Wi-Fi device 100 may be configured to store the feedback 310, for example in memory 104. The Wi-Fi device 100 may be configured to set antenna selection and transmission parameters based at least in part on the feedback 310 and other feedback.

In the example of FIG. 3, after the Wi-Fi device 100 receives feedback 310, the Wi-Fi device 100 transmits a second probe packet 308B to a receiving Wi-Fi device using a second antenna 114.2. In this example, first probe packet 308A and second probe packet 308B have the same transmission parameters, with the exception of being transmitted by different antennas. For example, if first probe packet 308A has a first transmission power and a first bit rate, second probe packet 308B also has the first transmission power and the first bit rate.

After the Wi-Fi device 100 transmits second probe packet 308B, second antenna 114.2 may receive feedback 312. Feedback 312 may be any of the type of feedback described above with respect to feedback 310. Next, the Wi-Fi device 100 transmits a third probe packet 314A by first antenna 114.1. The third probe packet 314A in this example includes a different set of transmission parameters than the first probe packet 308A or the second probe packet 308B. In this example, the Wi-Fi device 100 transmits probe packets with different transmission parameters on the various antennas to optimize both the antenna selection and the transmissions parameters. For example, the Wi-Fi device 100 may be configured to transmit the first probe packet 308A and the second probe packet 308B with a first transmission power, while the Wi-Fi device 100 may be configured to transmit the third probe packet 314A with a second transmission power different from the first transmission power. Or, the third probe packet 314A may have a different MCS, or other transmission parameters compared to the first probe packet 308A and the second probe packet 308B. The Wi-Fi device 100 may be configured to select the transmission parameters of the third probe packet 314A based at least in part on the feedback 310 and/or the feedback 312 in some examples. In other examples, memory 104 may store preset transmission parameters for the various probe packets.

After the Wi-Fi device 100 transmits third probe packet 314A by first antenna 114.1, the Wi-Fi device 100 may receive feedback 316. Feedback 316 may be any of the type of feedback described above with respect to feedback 310. After the Wi-Fi device 100 receives feedback 316, second antenna 114.2 may transmit fourth probe packet 314B. In this example, fourth probe packet 314B has the same transmission parameters as third probe packet 314A, with the exception of being transmitted by different antennas. For example, if third probe packet 314A has a second transmission power and a second bit rate, fourth probe packet 314B also has the second transmission power and the second bit rate.

After the Wi-Fi device 100 transmits fourth probe packet 314B, second antenna 114.2 may receive feedback 318. Feedback 318 may be any of the type of feedback described above with respect to feedback 310. Next, the Wi-Fi device 100 transmits a fifth probe packet 320 by first antenna 114.1. The Wi-Fi device 100 may be configured to transmit fifth probe packet 320 in this example with a different set of transmission parameters than the first probe packet 308A, the second probe packet 308B, the third probe packet 314A, or the fourth probe packet 314B. After the Wi-Fi device 100 transmits fifth probe packet 320 by first antenna 114.1, the Wi-Fi device 100 may receive feedback 322. Feedback 322 may be any of the type of feedback described above with respect to feedback 310.

In this example, after the Wi-Fi device 100 receives feedback 322, Wi-Fi device 100 selects first antenna 114.1 and the transmission parameters associated with fifth probe packet 320. The process then moves to the data exchange phase 306 of TXOP 302. In the data exchange phase 306, a PPDU transmission 324 transmits data from Wi-Fi device 100 to a receiving Wi-Fi device using first antenna 114.1 and the transmission parameters of fifth probe packet 320. First antenna 114.1 may then receive feedback 326 from the receiving Wi-Fi device. As shown in FIG. 3, the Wi-Fi device 100 may be configured to conduct all of the antenna selection and transmission parameters tuning phase 304 and the data exchange phase 306 in a single TXOP 302.

In other examples, the Wi-Fi device 100 may use more than two antennas, and the Wi-Fi device 100 may transmit any number of probe packets to tune the transmission parameters. The Wi-Fi device 100 may receive feedback from the probe packets and used to select the best antenna and transmission parameters for the communication medium.

Figure 4:
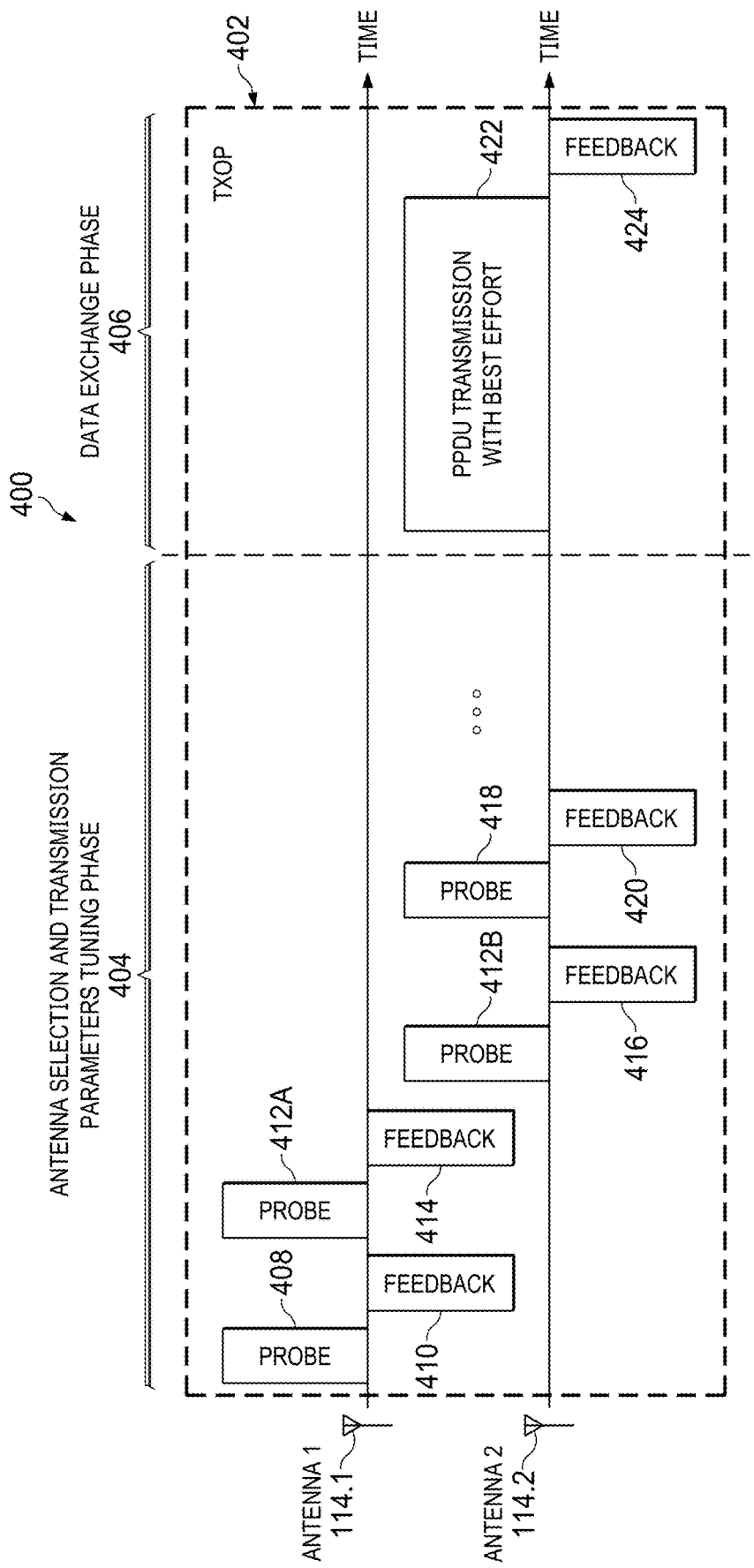
FIG. 4 is a timing diagram of antenna and rate selection in accordance with various examples.

FIG. 4 is a timing diagram 400 of antenna and rate selection using a PPDU burst in accordance with various examples herein. Timing diagrams 200, 300, and 400 are shown as separate processes, but a probing Wi-Fi device may be configured to implement any combination of the techniques described with respect to timing diagrams 200, 300, and 400. Timing diagram 400 shows a TXOP 402 where the probing Wi-Fi device performs antenna and rate selection and optimization using a consecutive multi-antenna probing PPDU burst. In timing diagram 400, the Wi-Fi device 100 selects the antenna to be used for a next transmission and optimizes the transmission parameters according to the communication channel. In this example, the Wi-Fi device 100 optimizes a first antenna using multiple probe packets. After that process is complete, the Wi-Fi device 100 can use the optimized parameters as a starting point for a second antenna. A similar process may continue for any number of antennas. This iterative process may reduce the amount of probe packets used during the selection and optimization process compared to other examples.

The example of timing diagram 400 includes two antennas, a first antenna 114.1 and a second antenna 114.2. The TXOP 402 in this examples includes an antenna selection and transmission parameters tuning phase 404 and a data exchange phase 406. At the start of phase 404, first antenna 114.1 transmits a first probe packet 408 to a receiving Wi-Fi device, such as Wi-Fi device 116. The Wi-Fi device 100 transmits first probe packet 408 with a set of transmission parameters. For example, first probe packet 408 may have a certain transmission power, a certain bit rate, a certain MCS, a certain format, etc. The Wi-Fi device 100 may store the transmission parameters in a memory such as memory 104, so the Wi-Fi device 100 may track the performance of the probe packets with different transmission parameters in order to assess the channel conditions to find a suitable or optimal antenna and a suitable or optimal set of transmission parameters corresponding to the communication medium.

After the Wi-Fi device 100 transmits first probe packet 408, first antenna 114.1 may receive feedback 410. Feedback 410 may be in the form of an ACK from the receiving Wi-Fi device, a NACK, CSI, etc., as described above. The Wi-Fi device 100 may store the feedback 410, for example in memory 104. The Wi-Fi device 100 may be configured to set antenna selection and transmission parameters based at least in part on the feedback 410 and other feedback.

In the example of FIG. 4, after the Wi-Fi device 100 receives feedback 410, the Wi-Fi device 100 transmits a second probe packet 412A to a receiving Wi-Fi device using first antenna 114.1. After the Wi-Fi device 100 transmits the second probe packet 412A, first antenna 114.1 may receive feedback 414. Feedback 414 may be any of the type of feedback described above with respect to feedback 410. As described above, the Wi-Fi device 100 may be configured to transmit a number of probe packets from the first antenna 114.1 to optimize the transmission parameters for the first antenna 114.1. After the first antenna 114.1 transmits the probe packets and the Wi-Fi device 100 optimizes the transmission parameters, the process moves to a second antenna, using the optimized transmission parameters as a starting point for the second antenna. The Wi-Fi device 100 may be configured to repeat the process for any number of antennas, using any number of probe packets, until the Wi-Fi device 100 finds an optimal antenna and optimal transmission parameters. The Wi-Fi device 100 may be configured to perform these processes in a single TXOP as described herein.

In timing diagram 400, after the Wi-Fi device 100 receives feedback 414, the optimization of the transmission parameters for first antenna 114.1 is complete. The process then moves to second antenna 114.2, which transmits third probe packet 412B in this example. Third probe packet 412B has the same transmission parameters as second probe packet 412A. Second probe packet 412A included the optimized transmission parameters for first antenna 114.1, and Wi-Fi device 100 can use these transmission parameters as the starting point for second antenna 114.2.

After the Wi-Fi device 100 transmits third probe packet 412B, second antenna 114.2 receives feedback 416 from the Wi-Fi receiving device. Then, second antenna 114.2 transmits fourth probe packet 418. Fourth probe packet 418 has different transmission parameters than first probe packet 408, second probe packet 412A, or third probe packet 412B. After the Wi-Fi device 100 transmits fourth probe packet 418, the Wi-Fi device 100 receives feedback 420. Feedback 420 may be any of the type of feedback described above with respect to feedback 410.

In this example, Wi-Fi device 100 determines that second antenna 114.2 using the transmission parameters of fourth probe packet 418 is optimal for the communication medium. Therefore, the antenna selection and transmission parameters tuning phase 404 ends and the data exchange phase 406 begins. In the data exchange phase 406, a PPDU transmission 422 transmits data from Wi-Fi device 100 to a receiving Wi-Fi device using second antenna 114.2 and the transmission parameters of fourth probe packet 418. Second antenna 114.2 may then receive feedback 424 from the receiving Wi-Fi device. As shown in FIG. 4, the Wi-Fi device 100 may be configured to conduct all of the antenna selection and transmission parameters tuning phase 404 and the data exchange phase 406 in a single TXOP 402.

In examples herein, a probing Wi-Fi device may be configured to use any number of probing packets to find the optimal transmission parameters. Tradeoffs may be performed between choosing suitable transmission parameters quickly or choosing the best or optimal parameters using a longer process. The probing Wi-Fi device may use complex algorithms that utilize transmission power, bit rate, MCS, packet size, format, and other transmission parameters to optimize the communication. The Wi-Fi device 100, based on the feedback from previous probe packets, may choose the next best probe packet to transmit from among any number of potential probe packets. Additionally or alternatively, the Wi-Fi device 100 may be configured to determine whether or not to issue a another probing PPDU based on the evaluation result. The Wi-Fi device 100 may store the results in memory 104 in some examples.

Figure 5:
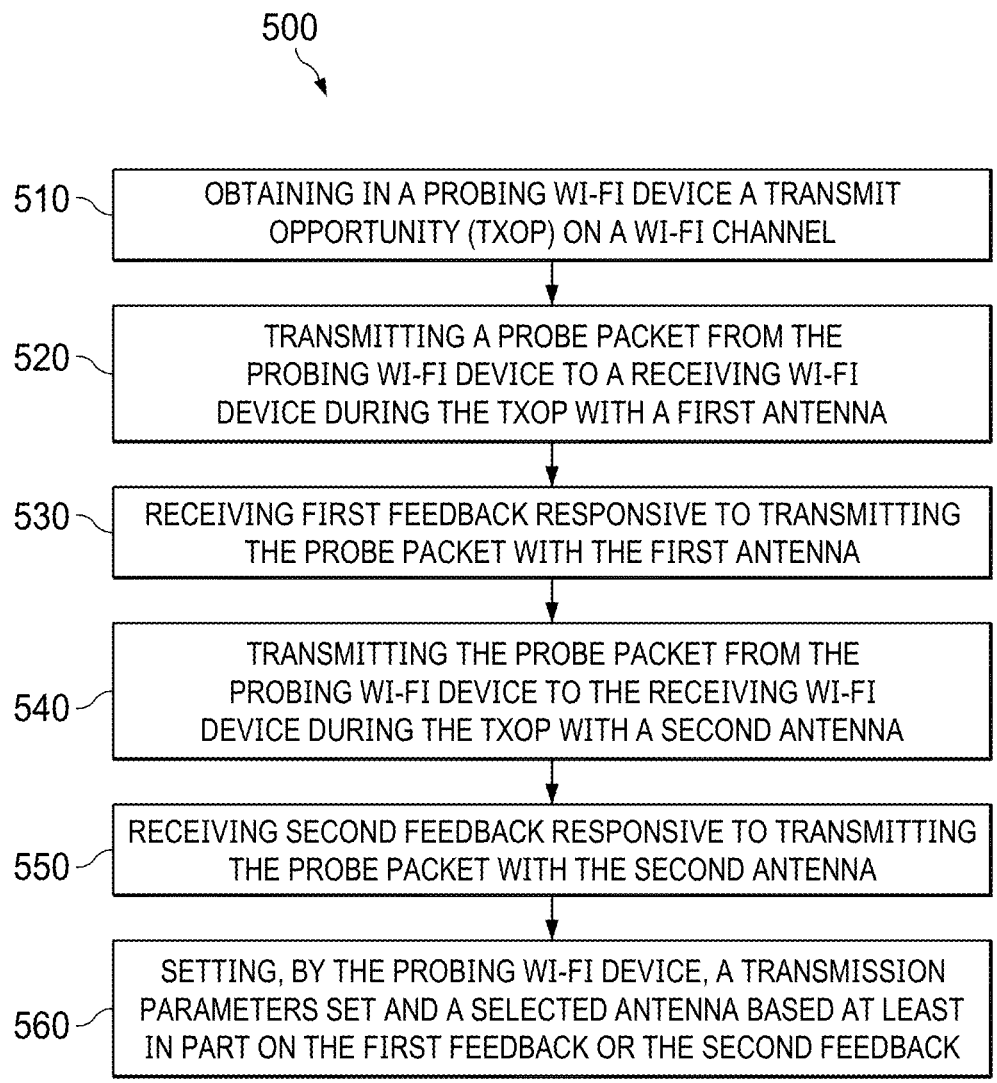
FIG. 5 is a flow diagram of a method for antenna selection in accordance with various examples.

FIG. 5 is a flow diagram of a method 500 for antenna selection in accordance with various examples herein. The steps of method 500 may be performed in any suitable order. The hardware components described above with respect to FIG. 1 may perform method 500 in some examples. Any suitable hardware or digital logic may perform method 500 in some examples.

Method 500 begins at 510, where a probing Wi-Fi device such as Wi-Fi device 100 wins the air access and obtains a TXOP on a Wi-Fi channel. The steps described in method 500 are performed at a single TXOP.

Method 500 continues at 520, where the probing Wi-Fi device transmits a probe packet with transmission parameters settings to a receiving Wi-Fi device during the TXOP with a first antenna. The probe packet may be a packet such as probe packet 208A described above. The probe packet may include any number of transmission parameters settings in various examples.

Method 500 continues at 530, where the probing Wi-Fi device receives first feedback responsive to transmitting the probe packet with the first antenna. The first feedback may be feedback such as feedback 210 described above.

Method 500 continues at 540, where the probing Wi-Fi device transmits the probe packet with the transmission parameters settings from the probing Wi-Fi device to the receiving Wi-Fi device during the TXOP with a second antenna. In this example, the probe packet may be a probe packet such as probe packet 208B, which has transmission parameters similar to probe packet 208A.

Method 500 continues at 550, where the probing Wi-Fi device receives second feedback responsive to transmitting the probe packet with the second antenna. The second feedback may be feedback such as feedback 212 described above.

Method 500 continues at 560, where the probing Wi-Fi device sets a transmission parameters set and the selected antenna based at least in part on the first feedback or the second feedback. The transmission parameters set may include any number or type of transmission parameters. As an example, in FIG. 2, the probing Wi-Fi device 100 transmits a PPDU Transmission 214 to a receiving Wi-Fi device using the transmission parameters set of probe packet 208B. In that example, the probing Wi-Fi device 100 uses the second antenna 114.2 for the PPDU Transmission 214, but the probing Wi-Fi device 100 may use another antenna in another example. In other examples, the probing Wi-Fi device 100 may use any number of antennas and send any number of probe packets before selecting transmission parameters.

Figure 6:
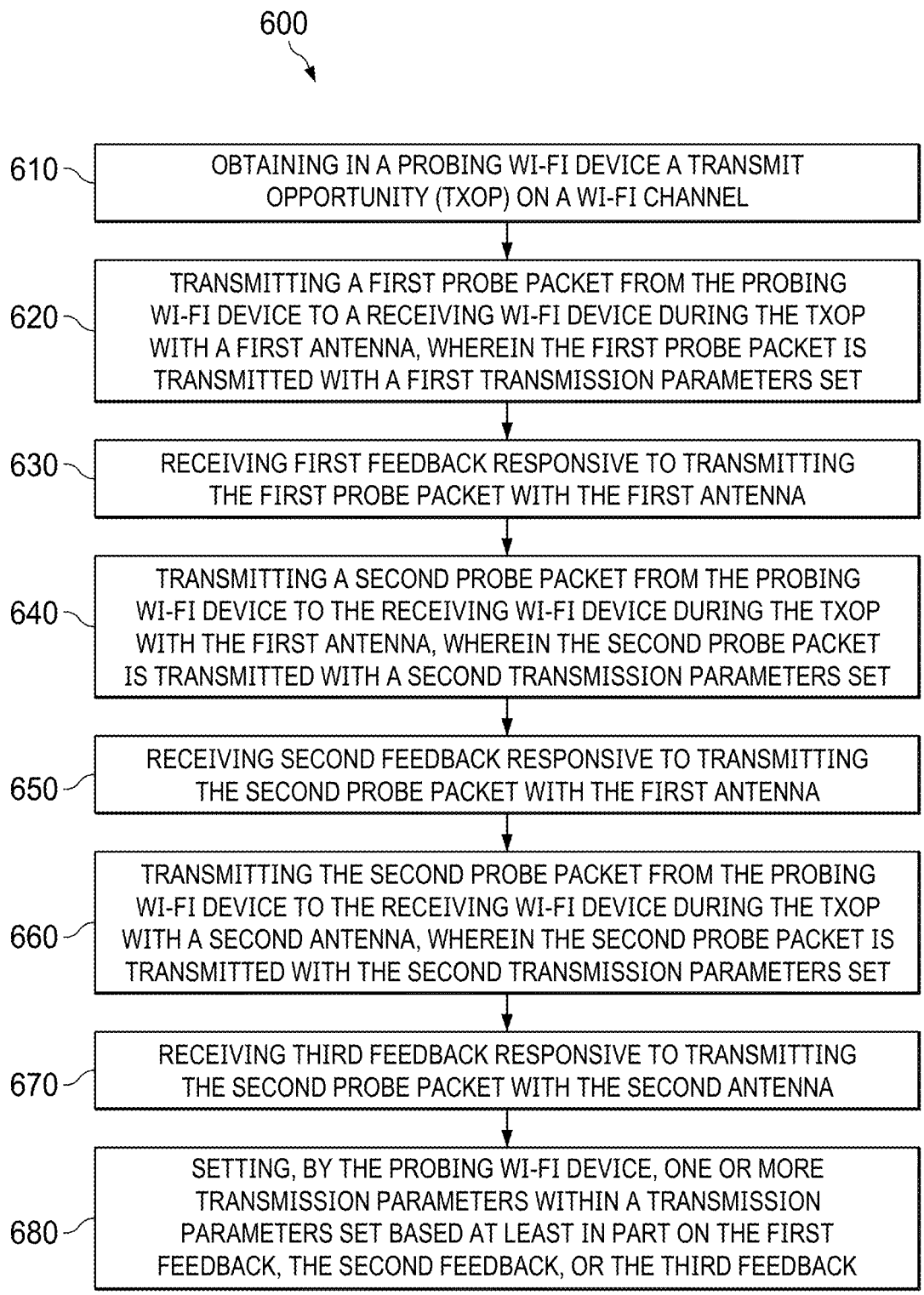
FIG. 6 is a flow diagram of a method for antenna and rate selection in accordance with various examples.

FIG. 6 is a flow diagram of a method 600 for antenna and rate selection in accordance with various examples herein. The steps of method 600 may be performed in any suitable order. The hardware components described above with respect to FIG. 1 may perform method 600 in some examples. Any suitable hardware or digital logic may perform method 600 in some examples.

Method 600 begins at 610, where a probing Wi-Fi device wins the air access and obtains a TXOP on a Wi-Fi channel. The steps described in method 600 are performed at a single TXOP.

Method 600 continues at 620, where the probing Wi-Fi device transmits a first probe packet with a first transmission parameters set to a receiving Wi-Fi device during the TXOP with a first antenna. As an example, the Wi-Fi device transmits the first probe packet 408 in FIG. 4 during TXOP 402.

Method 600 continues at 630, where the probing Wi-Fi device receives first feedback responsive to transmitting the first probe packet with the first antenna. The first feedback may be feedback 410 in one example.

Method 600 continues at 640, where the probing Wi-Fi device transmits a second probe packet with a second transmission parameters set to the receiving Wi-Fi device during the TXOP with the first antenna. The second probe packet may be second probe packet 412A in one example.

Method 600 continues at 650, where the probing Wi-Fi device receives second feedback responsive to transmitting the second probe packet with the first antenna. The second feedback may be feedback 414 in one example.

Method 600 continues at 660, where the probing Wi-Fi device transmits the second probe packet with the second transmission parameters set to the receiving Wi-Fi device during the TXOP with a second antenna. As an example, the probing Wi-Fi device transmits the second probe packet 412B with the second antenna 114.2.

Method 600 continues at 670, where the probing Wi-Fi device receives third feedback responsive to transmitting the second probe packet with the second antenna. The third feedback may be feedback 416 in one example.

Method 600 continues at 680, where the probing Wi-Fi device sets one or more transmission parameters within a transmission parameters set based at least in part on the first feedback, the second feedback, or the third feedback. As an example, in FIG. 4, the probing Wi-Fi device transmits a PPDU transmission 422 to a receiving Wi-Fi device using the transmission parameters of probe packet 418. In that example, the Wi-Fi device 100 uses the second antenna 114.2 for the PPDU transmission 422, but Wi-Fi device 100 may use another antenna in another example. In other examples, Wi-Fi device 100 may use any number of antennas and send any number of probe packets before selecting transmission parameters.

Figure 7:
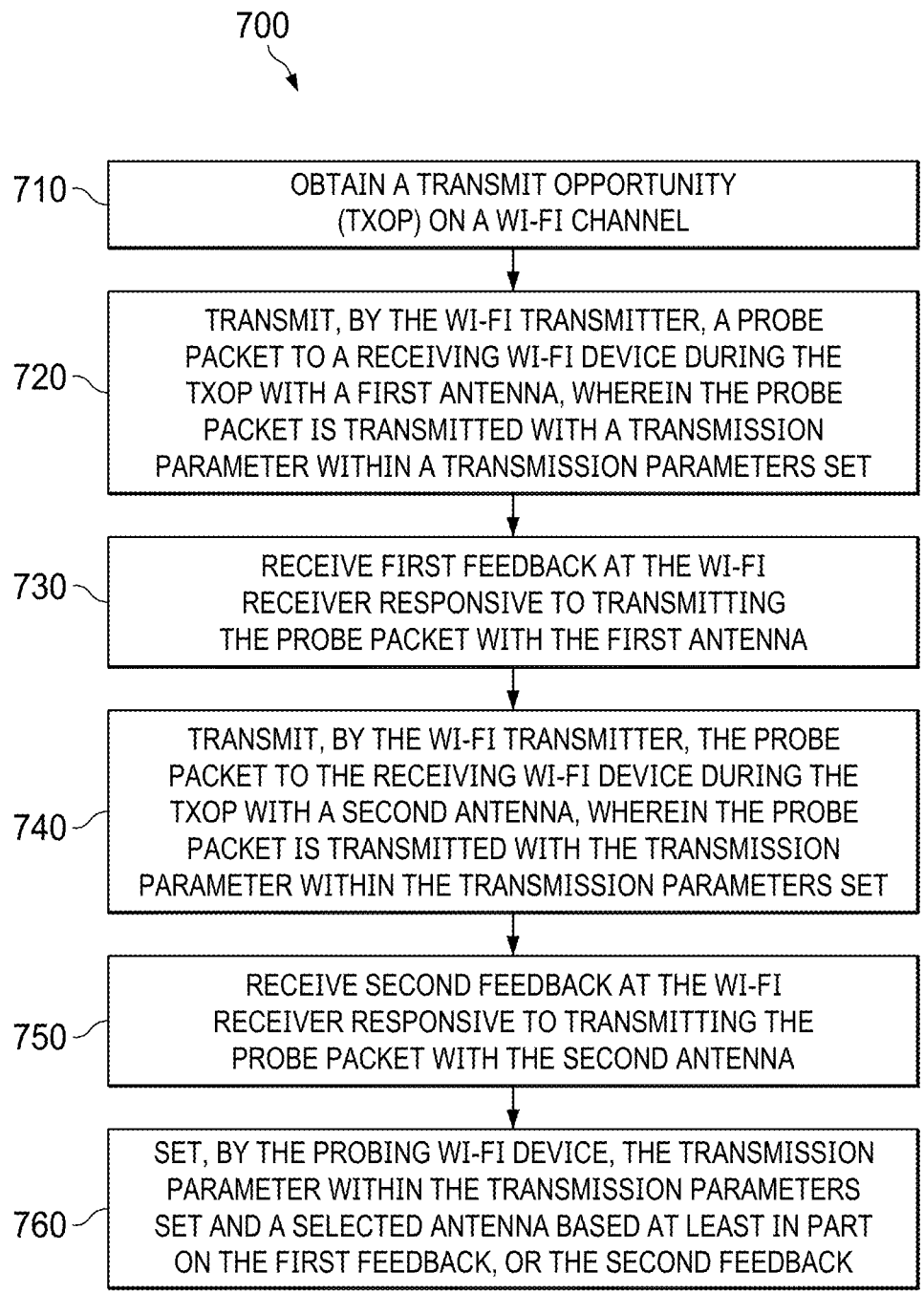
FIG. 7 is a flow diagram of a method for antenna and rate selection in accordance with various examples.

FIG. 7 is a flow diagram of a method 700 for antenna and rate selection in accordance with various examples herein. The steps of method 700 may be performed in any suitable order. The hardware components described above with respect to FIG. 1 may perform method 700 in some examples. Any suitable hardware or digital logic may perform method 700 in some examples.

Method 700 describes a memory, such as memory 104, storing instructions in a probing Wi-Fi device, such as Wi-Fi device 100. The Wi-Fi device 100 includes a processor 102 coupled to a Wi-Fi transmitter 110 and Wi-Fi receiver 112 in the probing Wi-Fi device 100. The Wi-Fi transmitter 110 and Wi-Fi receiver 112 are configured to communicate via a Wi-Fi channel, such as link 118. The processor 102 is configured to execute instructions or logic 106 stored in memory 104 to perform the steps of method 700.

Method 700 begins at 710, where the instructions cause the Wi-Fi device 100 to obtain a TXOP on a Wi-Fi channel. The steps described in method 700 are performed at a single TXOP.

Method 700 continues at 720, where the instructions cause the Wi-Fi transmitter 110 to transmit a probe packet to a receiving Wi-Fi device during the TXOP with a first antenna, where the Wi-Fi transmitter 110 transmits the probe packet with a transmission parameter within a transmission parameters set. As an example, the first antenna 114.1 may be configured to transmit probe packet 208A in FIG. 2.

Method 700 continues at 730, where instructions cause the Wi-Fi device 100 to receive first feedback at the Wi-Fi receiver 112 responsive to transmitting the probe packet with the first antenna. The first feedback may be feedback 210 in one example.

Method 700 continues at 740, where the instructions cause the Wi-Fi transmitter 110 to transmit the probe packet to the receiving Wi-Fi device during the TXOP with a second antenna, where the Wi-Fi transmitter 110 transmits the probe packet with the transmission parameter within the transmission parameters set. In this example, second antenna 114.2 transmits probe packet 208B to the receiving Wi-Fi device.

Method 700 continues at 750, where the instructions cause the Wi-Fi device 100 to receive second feedback at the Wi-Fi receiver 112 responsive to transmitting the probe packet with the second antenna. The second feedback may be feedback 212 in one example.

Method 700 continues at 760, where the instructions cause the probing Wi-Fi device, such as Wi-Fi device 100, to set the transmission parameter within the transmission parameters set and a selected antenna based at least in part on the first feedback or the second feedback.

In examples herein, a single probing TXOP is performed, where the probing Wi-Fi device generates feedback for multiple antennas from consecutive probing PPDUs during the single TXOP. The antenna selection time is faster than in other examples due to performing the antenna selection during a single TXOP, because the Wi-Fi device does not have to repeatedly compete for TXOPs with other devices. Also, the Wi-Fi device 100 may be configured to combine antenna selection and data transmission in a single TXOP, rather than applying the discovered transmission parameters to a data transmission during the next TXOP. This process provides more efficient data transmissions.

Moreover, the Wi-Fi device performs antenna selection and probing for transmission parameters in a single TXOP in some examples. The Wi-Fi device 100 may be configured to change the antenna used for a transmission during a TXOP, rather than waiting for the next TXOP. Also, the Wi-Fi device 100 can optimize multiple antennas during a single TXOP.

The term "couple" is used throughout the specification. The term may cover connections, communications, or signal paths that enable a functional relationship consistent with this description. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

Unless otherwise stated, "about," "approximately," or "substantially" preceding a value means +/−10 percent of the stated value. Modifications are possible in the described examples, and other examples are possible within the scope of the claims.

What is claimed is:

1. An electronic device comprising:
   a transceiver configured to be coupled to first and second antennas; and
   a processor configured to:
   transmit, via the transceiver and the first antenna, a first probe packet including a first transmission parameter during a first transmit opportunity (TXOP);
   receive, via the transceiver, a first response packet responsive to the first probe packet;

transmit, via the transceiver and the second antenna, a second probe packet during the first TXOP, the second probe packet being equal to the first probe packet;

receive, via the transceiver, a second response packet responsive to the second probe packet;

transmit, via the transceiver, a third probe packet including a second transmission parameter during the first TXOP, wherein the second transmission parameter is different than the first transmission parameter;

receive, via the transceiver, a third response packet responsive to the third probe packet; and set at least one of the first and second transmission parameters or select one of the first and second antennas based on the first, second, and third response packets.

2. The electronic device of claim 1, wherein the processor is configured to set at least one of the first and second transmission parameters based on the first, second, and third response packets.

3. The electronic device of claim 1, wherein the processor is configured to select one of the first and second antennas based on the first, second, and third response packets.

4. The electronic device of claim 1, wherein the processor is configured to set at least one of the first and second transmission parameters and select one of the first and second antennas based on the first, second, and third response packets.

5. The electronic device of claim 1, wherein the processor is configured to transmit the third probe packet via one of the first and second antennas.

6. The electronic device of claim 1, wherein the processor is configured to transmit, via the transceiver, a data packet during the first TXOP after setting the at least one of the first and second transmission parameters.

7. The electronic device of claim 1, wherein the first probe packet is a Physical Layer Convergence Protocol (PLCP) protocol data unit (PPDU).

8. The electronic device of claim 1, wherein the processor is configured transmit the third probe packet after transmitting the first probe packet.

9. The electronic device of claim 1, further comprising first and second antennas coupled to the transceiver.

10. The electronic device of claim 1, wherein the processor is configured to obtain the first TXOP on a wireless communication channel prior to transmitting the first probe packet.

11. The electronic device of claim 1, wherein the first response packet comprises channel state information (CSI).

12. The electronic device of claim 1, wherein the first response packet is an acknowledgement (ACK).

13. The electronic device of claim 1, wherein the first response packet is a negative acknowledgement (NACK).

14. The electronic device of claim 1, wherein the first transmission parameter is transmission power.

15. The electronic device of claim 1, wherein the first transmission parameter is a modulation coding scheme.

16. The electronic device of claim 15, wherein the modulation coding scheme is binary phase shift keying (BPSK), quadrature phase shift keying (QPSK), or quadrature amplitude modulation (QAM).

17. The electronic device of claim 1, wherein the processor is configured to:

transmit the third probe packet via the first antenna;

transmit, via the transceiver and the second antenna, a fourth probe packet including the second transmission parameter during the first TXOP; and receive, via the transceiver, a fourth response packet responsive to the fourth probe packet, wherein setting at least one of the first and second transmission parameters or selecting one of the first and second antennas is further based on the fourth response packet.

18. The electronic device of claim 1, wherein the processor is configured to:

transmit, via the transceiver, a fourth probe packet including a third transmission parameter during the first TXOP, the third transmission parameter being different than the first and second transmission parameters; and receive, via the transceiver, a fourth response packet responsive to the fourth probe packet, wherein setting at least one of the first and second transmission parameters or selecting one of the first and second antennas is further based on the fourth response packet.

19. The electronic device of claim 1, wherein the first TXOP is a TXOP according to an IEEE 802.11 protocol.

20. The electronic device of claim 1, wherein:

transmitting the first probe packet comprises transmitting the first probe packet to a wireless device;

transmitting the second probe packet comprises transmitting the second probe packet to the wireless device;

transmitting the third probe packet comprises transmitting the third probe packet to the wireless device;

receiving the first response packet comprises receiving the first response packet from the wireless device;

receiving the second response packet comprises receiving the second response packet from the wireless device; and receiving the third response packet comprises receiving the third response packet from the wireless device.

21. The electronic device of claim 1, wherein the first response packet comprises a packet error rate.

\* \* \* \* \*